United States Patent Office 2,894,981
Patented July 14, 1959

2,894,981
ALKYLATION OF MALONIC ESTERS

Bianka Tchoubar, Paris, France, assignor to Centre National de la Recherche Scientifique, Paris, France, a corporation of France No Drawing. Application December 18, 1953
Serial No. 399,150

Claims priority, application France May 22, 1950

1 Claim. (Cl. 260—485)

This application is a continuation-in-part of my application Serial No. 227,537, filed May 21, 1951, now abandoned.

It is the main object of my invention to obtain certain dialkyl malonic esters, particularly dialkyl malonic esters in which one of the substituent hydrocarbon radicals offers a chain branched from the carbon atom fixed on the malonic ester and corresponding to the following general formula:

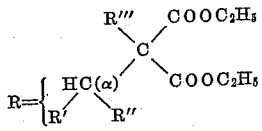

in which the hydrocarbon radical: R'R''HC— is an alkyl group branched at α which may be designated more generally by R; R' and R'' are themselves alkyl groups each having at least one carbon atom. Thus when R' and R'' both correspond to the group —$CH_3$, R represents the isopropyl group: $(CH_3)_2HC$—; R''' represents a hydrocarbon radical, saturated or not, and comprising a number of carbon atoms generally less than 6.

Now, my invention concerns a process for the alkylation of monoalkylated malonic esters in case one of the substituent alkyl groups is a hydrocarbon radical of the R type and the other substituent is of the R''' type whatever may be the order in which the substituents are introduced into the malonic ester. My invention concerns more especially a special alkylation agent making it possible to obtain easily and with a good yield the second alkylation of the malonic ester when the normal alkylation is difficult.

It is known that the conventional alkylation method generally used for effecting the substitution of a hydrocarbon radical for a hydrogen atom of an unsubstituted malonic ester consists in reacting an alkyl halide with a malonic ester, in the presence of a sodating and alkylating agent and of a solvent, the solvent being methanol or ethanol and the condensing agent being the corresponding sodium alcoholate. But if this method gives good results each time a mono-substituted malonic ester is to be prepared, things are different when it is desired to introduce a second substituent alkyl group in to the malonic ester, particularly when one of the two substituents offers a branched structure of the R type.

In the latter case, and particularly when R' and R'' together, make a total of at least four carbon atoms, the yield of the dialkylation by the conventional method drops very low, below 10%, often near 5%; the operation then becomes very costly for industrial exploitation. These difficulties have been known for a long time (Fischer and Dilthey, Ann. 335, 1904, p. 337; V. H. Wallingford, M. A. Thorpe, A. M. Homeyer, J. Am. Chem. Soc. 1942, 64, p. 580; Shonle, Keltch and Swanson, J. Am. Chem. Soc. 1930, 52, p. 2440). These authors reported that the preparation of disubstituted malonic esters comprising a substituent branched at α of the R type, is very difficult and even, in some cases, impossible by the conventional method.

This difficulty is explained by the very procedure of the reaction the latter being very sensitive to steric hindrance. It so happens that the alkyl groups comprising a branching at α are very bulky when a malonic ester has to be alkylated, the structure and constitution of which are already such as to determine a certain inertia of the alkylation reaction. It is known, indeed, that the replacement reaction for each one of the two hydrogen atoms for instance of ethyl malonate, by R and R''' hydrocarbon radicals by means of the corresponding halogenated derivatives, is effected in two steps. The first step (I) consists in the sodation of the malonic ester by sodium ethylate; the second step (II) consists in replacing sodium by the R or R''' radicals supplied by the corresponding halogenated derivative XR or XR''', X being a halogen atom. The two following equations are a schematic showing this double reaction:

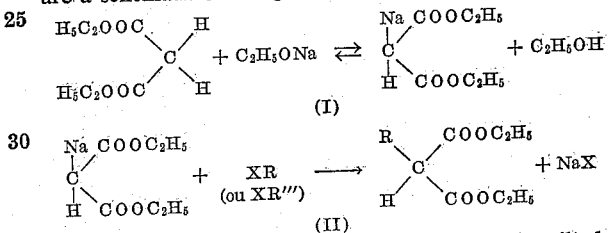

the step (I) is an equilibrium reaction. It will be realized, therefore, that when the alkylation is effected using sodium ethylate as a sodation agent, there is always present a certain amount of sodium ethylate which with XR (or XR''') causes a production in variable proportions, of a secondary reaction (III) leading to an ether-oxide:

$$C_2H_5ONa + XR \rightarrow C_2H_5OR + XNa$$
(III)

This secondary reaction is of very little importance, in the case of the replacing of the first hydrogen atom of the ethyl malonate but it may become very important when replacing by an alkyl group the second hydrogen of the mono-substituted malonate

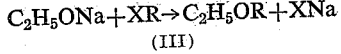

In particular, and as already noted above, it is in case one of the two substituents is R''' and the other one R, i.e., R'R''HC—, that the secondary reaction III becomes very important, so that the formation of ethyl dialkylmalonate takes place with a very poor yield. This is due to the steric hindrance presented by the hydrocarbon radical R, causing a considerable slowing down of the substitution reaction II of sodium fixed on the mono-substituted ethyl malonate.

The main reaction II is then much slower than the reaction III leading to the ether-oxide, which causes the evolution of the phenomenon in favour of the latter. The order in which the radicals R and R''' are introduced into the malonic ester is of little importance.

It should be noted that the inertia of the reaction II decreases considerably if, instead of a radical R, branched on the carbon atom α, one has to deal with a hydrocarbon radical which carries the branching at β, γ, . . . ω. In such cases, the steric hindrance is no longer felt and it is not necessary to use special conditions such as those taught by my invention for obtaining results.

It appears clearly from the above, that the conventional method involves unquestionable deficiencies each time the dialkylation of a malonic ester involves the use of a R substituent branched at α.

However, this latter method is commended through the U.S.A. Patent No. 1,985,217 to Eli Lilly (1934). Now, despite the fact that it does not appear in said patent the yields which are obtained when strictly following the working method described in this patent do not exceed 10%, often about about 5% for the ethyl (ethyl-1-butyl)di-ethyl malonate, the main product of the reaction being formed of an ether-oxide resulting from the action of bromo-3-hexane on sodium ethylate:

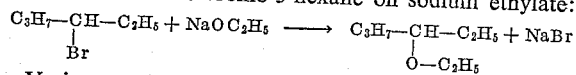

Various authors have studied the problem, not only, as seen above, for mentioning the poor conditions of reaction II, but also for endeavouring to supply a better solution. Thus Wallingford, Melvin and Thorpe (J.M. Chem. Soc. 1942, 64, p. 580) tried to avoid the difficulty by eliminating the alcohol after sodation I of the mono-substituted malonate by sodium ethylate. This elimination which is effected by distillation or by driving off by means of other solvents such as an alkyl carbonate for instance, is difficult and time consuming, particularly if it is desired to eliminate all traces of ethanol.

On the other hand, it is known by W. B. Renfrow, J. Am. Chem. Soc. 68—1301, 1946 that for carrying out alkylation of β-ketoesters, methylic and ethylic alcohols are advantageously replaced by tertiary butylic alcohol. However, in this case the use of this solvent is not imparted by consideration of sterical nature.

I have now found a very simple and efficient solution relating to the obtention of esters of substituted malonic acid comprising an alkyl group R branched at α and an alkyl group of the R''' type. In accordance with my invention the method for effecting the di-substitution of malonic ester with a very good yield consists in using sodium tertiary butylate in tertiary butylic alcohol medium as condensing agent for a mono-substituted malonic ester. The use of this reagent makes it possible to prepare with yields comprised between 60 and 80%, without any difficulty, di-substituted ethyl malonates, comprising an R radical ramified at α.

The following table gives, by way of example, an outline of the main di-substituted malonates corresponding to the general formula

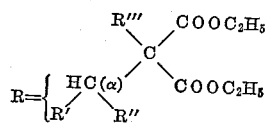

in which the hydrocarbon radical: R' R'' HC— is an alkyl group branched at α which may be designated more generally by R; R' and R'' are themselves alkyl groups each having at least one carbon atom and R''' represents a hydrocarbon radical, saturated or not, and comprising a number of carbon atoms generally less than 6, which have been easily prepared according to my invention. Diethylic ester of malonic acid was taken as a base of the transformation and the nature of R, i.e. of R' and R'', and of R''' has been varied. The fourth column shows the pure products yields obtained and the fifth column the physical constant concerning the boiling point. It can be seen that the yields are generally very high.

TABLE

| R' | R'' | R''' | Yield, Percent | E. P., ° C. |
|---|---|---|---|---|
| CH₃ | CH₃ | C₂H₅ | 65 | 112–115/18 mm. of Hg. |
| CH₃ | CH₃ | C₄H₉ | 60 | 130–131/20 mm. of Hg. |
| CH₃ | C₂H₅ | C₃H₇ | 70 | 135–136/20 mm. of Hg. |
| CH₃ | C₃H₇ | CH₃ | 78 | 135–137/20 mm. of Hg. |
| CH₃ | C₃H₇ | C₂H₅ | 75 | 139–142/20 mm. of Hg. |
| CH₃ | C₃H₇ | C₃H₇ | 72 | 146–147/20 mm. of Hg. |
| CH₃ | C₄H₉ | CH₃ | 75 | 130–132/10 mm. of Hg. |
| CH₃ | C₄H₉ | C₂H₅ | 85 | 138–140/12 mm. of Hg. |
| CH₃ | C₄H₉ | C₃H₇ | 72 | 145–146/12 mm. of Hg. |
| CH₃ | C₅H₁₁ | C₂H₅ | 85 | 141–143/14 mm. of Hg. |
| C₂H₅ | C₂H₅ | Allyl / C₂H₅ | 65 / 73 | 129–130/12 mm. of Hg. / 125–127/11 mm. of Hg. |
| C₂H₅ | C₃H₇ | CH₃ | 62 | 130–131/11 mm. of Hg. |
| C₂H₅ | C₃H₇ | C₂H₅ | 75–80 | 144–145/18 mm. of Hg. |
| C₂H₅ | C₃H₇ | C₄H₉ | 68 | 160–162/28 mm. of Hg. |
| C₂H₅ | C₄H₉ | C₂H₅ | 60 | 146–148/14 mm. of Hg. |
| C₂H₅ | C₅H₁₁ | C₂H₅ | 70 | 152–153/16 mm. of Hg. |
| C₃H₇ | C₃H₇ | CH₃ | 65 | 137–139/15 mm. of Hg. |
| C₃H₇ | C₃H₇ | C₂H₅ | 58 | 141–144/15 mm. of Hg. |
| C₃H₇ | C₄H₉ | C₂H₅ | 63 | 157–158/16 mm. of Hg. |

The following numerical example will serve for illustrating the working method according to which each one in the diethylic esters of the disubstituted malonic acid indicated in the foregoing table has been prepared. This working method is substantially the same for all products, only the proportions of the used reagents may vary, which is easy to calculate by the man skilled in the art.

*Preparation of ethyl (ethyl-1-butyl)ethyl malonate*

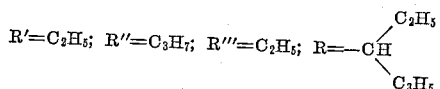

To sodium tertiary butylate prepared by the action of one mole (23 g.) of sodium on 800 cc. of dry tertiary butylic alcohol, there was added 1 mole of (ethyl-1-butyl) di-ethyl malonate. To the solution thus obtained, there was added, while stirring, 1.2 moles of ethyl bromide heated to reflux, while stirring was effected. After heating for 7 to 8 hours and after treating in the usual manner (elimination of the tertiary butylic alcohol, dissolving the residue in water, other extraction, evaporation of the solvent and fractioning in vacuum of the resultant product) there was obtained the ethyl (ethyl-1-butyl) malonate with a yield of 75 to 80%. Boiling point 144–145° C./18 mm./Hg. $n_D^{20}$: 1.4375–1.4380.

From the disubstituted alkyl malonates obtained according to the method of my invention, all sorts of products can be prepared obviously, particularly the corresponding barbituric and thio-barbituric acids.

In the above description and examples, reference has been made to ethylic esters of disubstituted malonic acid. Now, it may be easily understood that my invention includes dialkylation both of methylic or ethylic ester or of higher alkyl esters of the malonic acid.

What I claim is:

An improved method for the production of diethyl (1-ethyl butyl) ethyl malonate consisting in heating under reflux diethyl (1-ethyl butyl) malonate with ethyl bromide in solution in dry tertiary butylic alcohol as a solvent and in the presence of sodium tertiary butylate as a condensing agent.

References Cited in the file of this patent

UNITED STATES PATENTS

| 1,842,293 | Shonle | Jan. 19, 1932 |
| 1,998,307 | Carswell et al. | Apr. 16, 1935 |
| 2,237,265 | Shonle | Apr. 1, 1941 |
| 2,290,274 | Bywater et al. | July 21, 1942 |

FOREIGN PATENTS

| 494,320 | Germany | Mar. 25, 1930 |
| 649,682 | Great Britain | Jan. 31, 1951 |